UNITED STATES PATENT OFFICE.

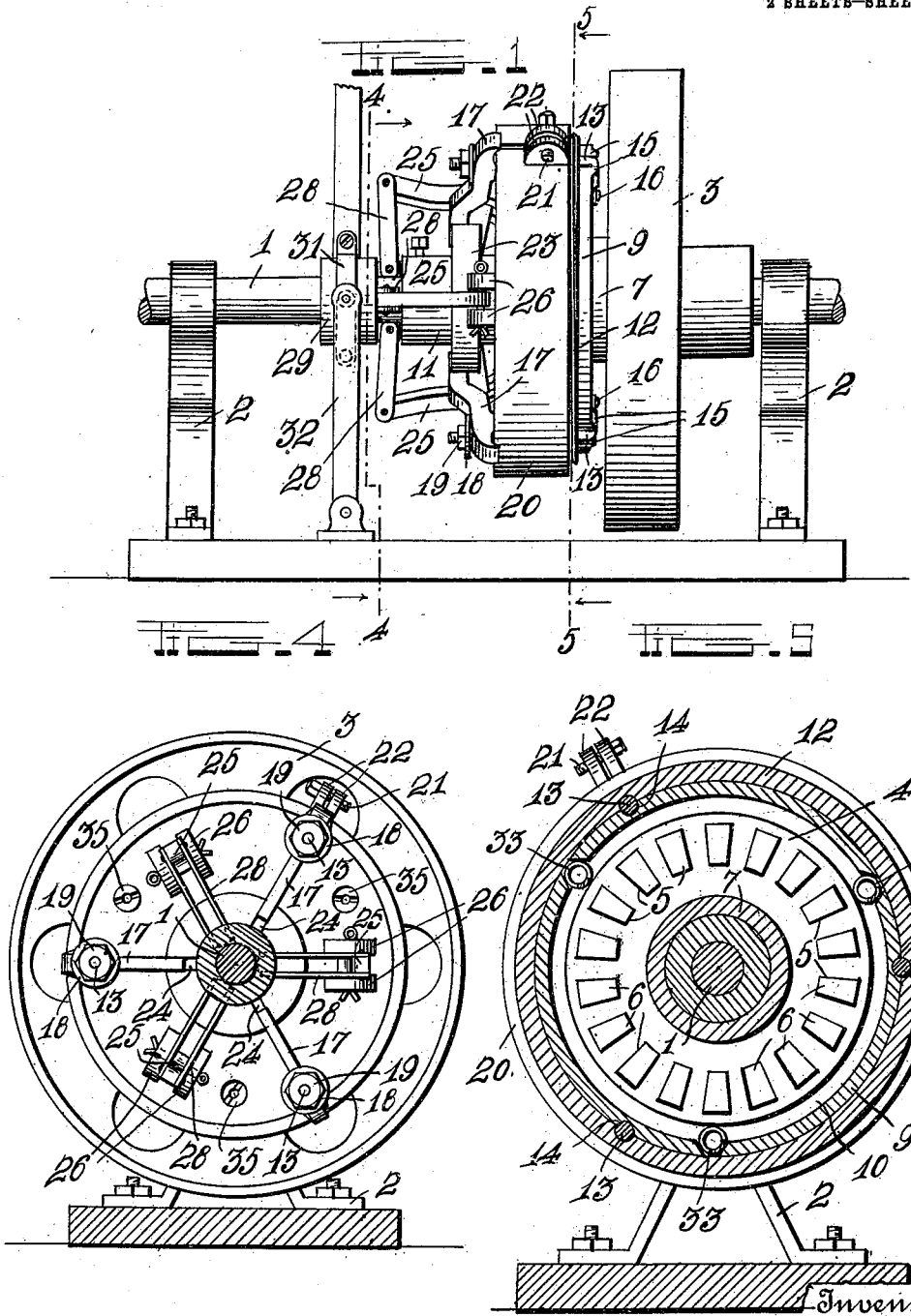

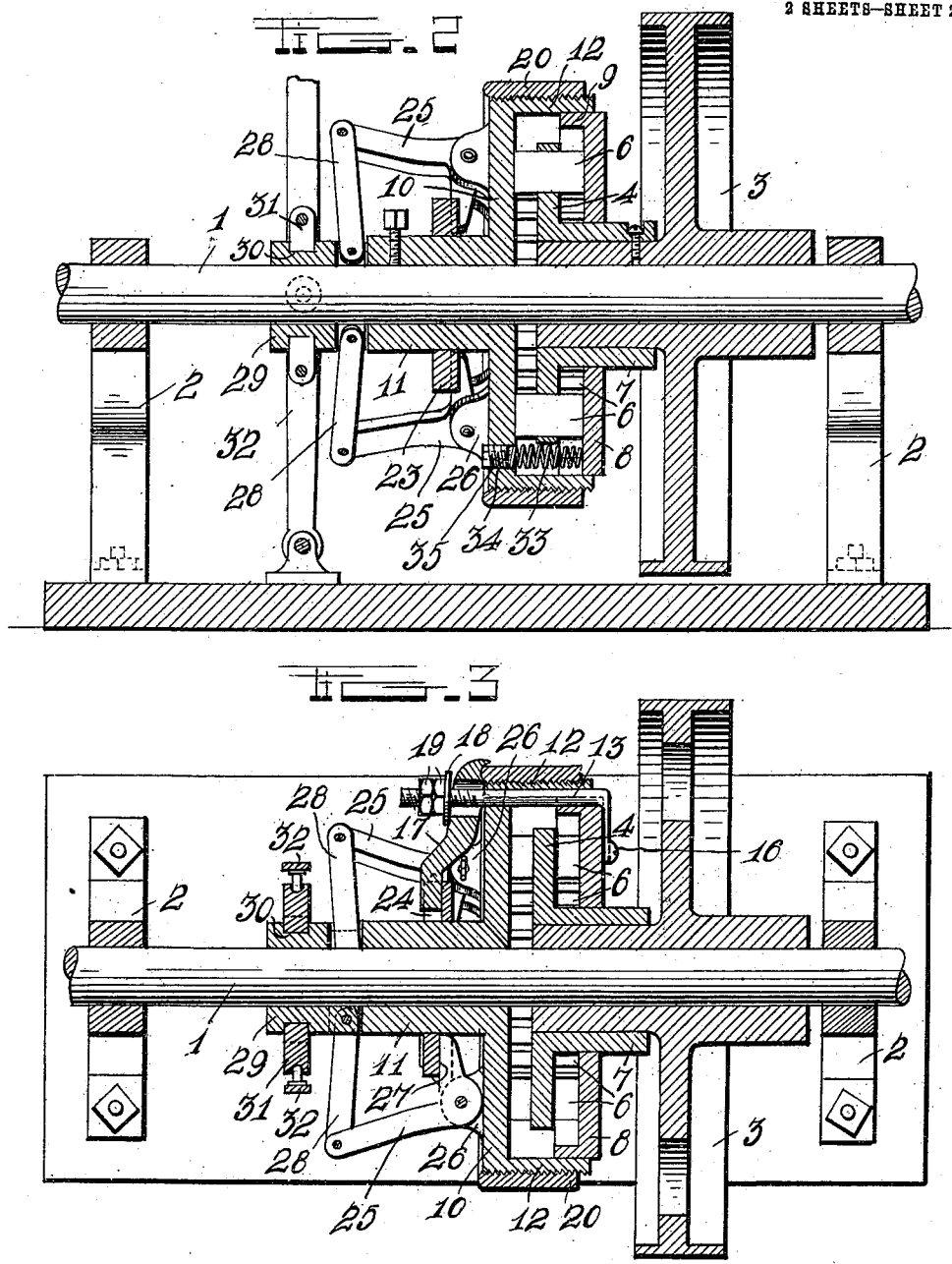

FERDINAND F. HOEHNE, OF KAUKAUNA, WISCONSIN.

FRICTION-CLUTCH.

979,952.  Specification of Letters Patent.  Patented Dec. 27, 1910.

Application filed March 7, 1910. Serial No. 547,914.

*To all whom it may concern:*

Be it known that I, FERDINAND F. HOEHNE, a citizen of the United States, residing at Kaukauna, in the county of Outagamie and State of Wisconsin, have invented certain new and useful Improvements in Friction-Clutches; and I do declare the following to be a full, clear, and exact description of the invention, such as will enable others skilled in the art to which it appertains to make and use the same.

This invention relates to improvements in friction clutches.

One object of the invention is to provide a friction clutch for loose pulleys, shafts and the like, whereby the same may be instantly thrown into and out of operation.

Another object is to provide a friction clutch having means whereby the parts may be adjusted to work loosely or tightly and to take up wear, thus enabling the parts to be kept in proper working position.

With the foregoing and other objects in view, the invention consists of certain novel features of construction, combination and arrangement of parts as will be more fully described and particularly pointed out in the appended claims.

In the accompanying drawings, Figure 1 is a side view of a clutch constructed in accordance with the invention; Fig. 2 is a central vertical longitudinal section taken on a line with one of the disk retracting or clamping bolts; Fig. 3 is a horizontal section taken on a line with one of the disk expanding springs; Fig. 4 is a vertical cross section on the line 4—4 of Fig. 1; Fig. 5 is a similar view on the line 5—5 of Fig. 1.

Referring more particularly to the drawings, 1 denotes a shaft which is revolubly mounted in suitable bearings 2, and on which is loosely mounted a pulley 3. The pulley 3 is provided with oppositely projecting hubs, on one of which is fixedly secured an annular clutch member comprising a disk 4, in which is formed a series of radially disposed slots 5, in each of which and projecting beyond the opposite sides of the disk are a series of friction blocks 6 formed of wood or other suitable friction material.

Loosely mounted on the hub 7 of the clutch member 4 is a clamping plate 8 having an annular inwardly projecting flange 9, which is adapted to fit into a clamping member comprising a disk 10 having a hub 11 mounted on and adapted to be fixedly secured to the shaft 1 by a set screw or other suitable fastening device. On the outer edge of the disk 10 is formed an inwardly projecting annular flange 12, on the outer surface of which are formed screw threads, the purpose of which will be hereinafter described.

The disks 8 and 10 of the clamping members are adapted to be drawn together and into frictional engagement with the friction blocks 6 of the clutch disk 4 by suitable fastening devices hereinafter described. To the disk 8 are secured the outer ends of a series of connecting and retracting bolts 13. Said bolts occupy the depressions 14 formed in the periphery of the flange 9 of the disk 8, and have their outer ends bent at right angles to engage between pairs of lugs 15 formed on the outer side of the disk as shown, said right angularly bent ends of the bolts being preferably fastened by screws or similar fastening devices 16. The opposite or threaded ends of the bolts 13 project through guide passages formed in the flange 12 and disk 10 and have loosely engaged therewith short clamping levers 17, which will be hereinafter more fully described. The levers 17 are held in operative engagement with the bolts 13 by washers 18 and nuts 19, which are adapted to be adjusted to bring the levers into proper position.

On the threaded outer surface of the flange 12 of the disk 10 is screwed a split bearing ring or band 20, which is adapted to be screwed back and forth on said threaded flange thereby adjusting its position on said flange. The ring, after being thus adjusted, is brought into tight clamping engagement with the threaded flange and thus locked in its adjusted position by means of a clamping bolt 21 having a threaded engagement with a pair of apertured lugs 22 formed on the opposite ends of the split band as shown.

The outer ends of the levers 17 have formed in their inner faces curved recesses adapted to be brought into frictional engagement with the rounded outer edge of the adjusting band or ring 20, said rounded edge of the band thus serving as a fulcrum on which the levers are rocked to draw the bolt 13 through the clamping disk 10, thereby drawing said disk 10 and the disk 8 into tight frictional engagement with the blocks in the friction disk 4, thereby connecting the disk 4 and pulley with the clamping members of the clutch. By screwing the ring or band 20 inwardly and outwardly on the threaded flange of the clamping disk 10, the fulcrum of the levers 17 may be varied to cause said levers to act more or less quickly or more tightly or loosely, as may be desired. This adjustment of the band 20 also provides for taking up all wear and lost motion of the parts.

Slidably mounted on the hub 11 of the clamping disk 10 is a lever operating collar 23, in the outer side of which is formed a series of notches 24 with which are engaged the inner ends of the levers 17, whereby when the collar 23 is forced outwardly, the levers will be rocked on their fulcrum and caused to act on the nuts of the bolts 13 thereby drawing the clamping disks 8 and 10 into operative engagement with the blocks 6 in the friction disk 4. The collar 23 is shifted on the hub 11 of the disk 10 to operate the levers 17 by means of bell crank shifting levers 25, which are fulcrumed between apertured bearing lugs 26 formed on the outer side of the clamping disk 10, as shown. In the inner face of the collar 23 is formed a series of radial notches 27 with which are adapted to be engaged the inner ends of the bell crank levers when the latter are actuated to shift the collar. The outer ends of the bell crank levers 25 are connected by links 28 to an operating sleeve 29 slidably mounted on the shaft 1. The sleeve 29 is provided with an annular groove 30 with which is loosely engaged a ring 31, to which is connected in any suitable manner a shifting lever 32. By means of the lever 32 the sleeve may be shifted on the shaft in the proper direction to actuate the bell crank levers 25, thereby causing the same to engage and shift the collar 23, thus causing the latter to rock the levers 17 and thereby draw the clamping disks into operative engagement with the blocks of the friction disk as hereinbefore described. In order to expand the disks 8 and 10 and disengage them from the blocks of the friction disk and to normally hold said disks in a retracted or expanded position, I provide a series of expanding springs 33, which are arranged between the disks 8 and 10, (see Figs. 2 and 5). The springs 33 are preferably placed in position between the disks through threaded apertures 34 formed in the clamping disk 10, said springs engaging suitable recesses provided therefor in the flanges of the disk 8. The springs are held in position and the tension thereof regulated by means of short tension adjusting screws 35, which are screwed into the threaded apertures 34 through which the springs are inserted.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim is:—

1. In a friction disk, a shaft, a pulley loosely mounted on said shaft, a friction disk carried by said pulley, said disk having arranged therein an annular series of friction blocks, a clamping disk carried by the pulley, a clamping disk fixedly mounted on the shaft and having a sliding engagement with the clamping disk on said pulley, a series of disk connecting bolts, operating levers loosely mounted on said bolts and adapted to be actuated to draw said clamping disks together into frictional engagement with the blocks in said friction disk, a fulcrum member for said operating levers adjustably mounted on said fixed clamping disk, means to operate said levers, and means to force said disks apart and normally hold the same out of engagement with the friction disk when released by said operating lever.

2. In a friction clutch, a shaft, a pulley loosely mounted on said shaft, a friction disk fixedly mounted on the hub of said pulley, an annular series of radially projecting friction blocks arranged in said disk and projecting beyond the opposite sides thereof, a clamping disk loosely mounted on the hub of said friction disk, a clamping disk fixedly mounted on said shaft, said fixed disk having an annular exteriorly threaded flange adapted to receive the clamping disk on the hub of the friction disk, a series of bolts connected to the latter clamping disk and projecting through the disk fixed on the shaft, a series of disk clamping levers loosely mounted on said bolts, means to operate said levers to draw said clamping disks into frictional engagement with the blocks of said friction disk, an adjustable fulcrum band having a threaded engagement with the threaded flange of said fixed clamping disk and adapted to be engaged by the outer end of said levers, thus providing a fulcrum for the same, and means whereby said disks are expanded or moved out of engagement with said friction disk when said levers are released.

3. In a friction clutch, a shaft, a pulley loosely mounted thereon, a friction disk carried by said pulley, a clamping disk arranged on said friction disk, a clamping disk fixedly mounted on said shaft, a series of connecting rods secured to the clamping disk on said friction disk and projecting through the clamping disk on the shaft, a series of operating levers loosely mounted on said rods, and an adjustable fulcrum for said levers, a slidably mounted lever operating collar adapted to be engaged with said levers, a series of bell crank levers having an operative engagement with said collar whereby the latter is shifted to operate said clamping levers, a clutch operating sleeve slidably mounted on said shaft, a series of links to connect said bell crank levers with said sleeves and an operating lever connected with said sleeve.

In testimony whereof I have hereunto set my hand in presence of two subscribing witnesses.

FERDINAND F. HOEHNE.

Witnesses:
  C. Douglas Towsley,
  J. N. Schneider.